(12) United States Patent
Zhang et al.

(10) Patent No.: US 8,408,835 B1
(45) Date of Patent: Apr. 2, 2013

(54) CLAMP FOR SECTION TUBES WITH RIGID HOOKED LEVER

(76) Inventors: Zhijun Zhang, Changzhou (CN); Lianping Liu, Changzhou (CN)

( * ) Notice: Subject to any disclaimer, the term of this patent is extended or adjusted under 35 U.S.C. 154(b) by 0 days.

(21) Appl. No.: 13/343,721

(22) Filed: Jan. 5, 2012

(51) Int. Cl.
 *F16B 7/04* (2006.01)
(52) U.S. Cl. .......................... 403/255; 403/252
(58) Field of Classification Search .......... 403/231, 403/252–255, 374.2, 37.3, 37.34; 52/705
 See application file for complete search history.

(56) References Cited

U.S. PATENT DOCUMENTS

| | | | | |
|---|---|---|---|---|
| 3,574,367 A | * | 4/1971 | Jankowski | 403/201 |
| 3,811,785 A | * | 5/1974 | Hagglund | 403/255 |
| 4,345,849 A | * | 8/1982 | Stenemann | 403/252 |
| 4,360,286 A | * | 11/1982 | Beer | 403/201 |
| 4,641,983 A | * | 2/1987 | Strassle | 403/12 |
| 5,127,761 A | * | 7/1992 | Vieler | 403/252 |
| 5,143,474 A | * | 9/1992 | Vieler | 403/252 |
| 5,464,298 A | * | 11/1995 | Schomakers | 403/252 |
| 6,116,808 A | * | 9/2000 | Strassle et al. | 403/252 |
| 6,334,732 B1 | * | 1/2002 | Strassle et al. | 403/321 |
| 6,402,420 B1 | * | 6/2002 | Yang | 403/381 |
| 7,357,592 B2 | * | 4/2008 | Offenbroich | 403/252 |
| 2010/0229496 A1 | * | 9/2010 | Munakata et al. | 52/705 |

* cited by examiner

*Primary Examiner* — Joshua Kennedy

(57) ABSTRACT

A clamp for section tubes having a shell with a front lateral, a fork contained in the shell and having a pair of arms and a fork neck, an end block fixed to the arms and an end slope, a slide block between the arms and having a rear slope, a pair of rigid tie bars each having a rear end pivotally linked to the fork neck, a hooked head sticking out from the front lateral and a middle recess facing each other, a pillar fixed to the shell and sandwiched in the middle recesses, a control screw rotatably contained in the shell and having a middle thread portion engaging with the slide block, an end spring between the shell and the end block, and a first and a second side springs respectively between the shell and the tie bars.

1 Claim, 5 Drawing Sheets

CLAMP FOR SECTION TUBES WITH RIGID HOOKED LEVER

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a clamp for section tubes, and more particularly, to a clamp for production of readily assembled and dismantled framework structure made up with section tubes, in particular for use at fairs and exhibitions.

2. Description of Related Art

Modular panel frame assembly system is widely used in applications as office partitions, display racks, and window supports. A typical conventional expandable clamp for modular panel frame assembly often has opposing jaws that are always separated from each other by a substantial space. The frame members have at least one longitudinal central slit which is able to be engaged by the expandable clamp. Some former jaws are rigid which are not able to be bent. However, clamp having such kind of jaws has a main drawback that the jaws is fixed and not able to be longitudinally adjusted. Such clamp can only be used with predetermined modular panel and the assembly of the frame may become loose after use.

Shown in FIGS. 10 and 11 is an improved clamping means 9 for inter connecting more than one profile tubes (not shown) together to set up a framework structure for use at fairs and exhibitions. The profile tubes 8 has at least four identical side surfaces 81, each having a longitudinal slit 82 defined therein. The clamping means 9 has a shell 90 and at least one latch 92. The shell 90 has at least one longitudinal chamber 91 which is able to slidably receive the latch 92. The latch 92 has a cover containing a hooked lever 93 which is able to be pulled by a screw 94. The screw 94 is able to be buttoned down. In assembly, a user is able to press down the screw 94 and then insert the latch 92 into the chamber 91. When the screw 94 passes a through hole 95 defined in the shell 90, it upsprings and is matchingly received in the hole 95, thus making the latch 92 stably fixed with respect to the shell 90. The shell 90 may have a pair of opposite side guiding grooves 96 matching a pair of opposite guiding bars 83. When the shell 90 is inserted into the profile tube 8 as particularly shown in FIG. 11, it is able to be fixed there with several screws 84. A screw lever 85 can be used to access the screw 94 via an opening 86 defined in the side surfaces 81. The screw 94 can be tightened or loosened to control the hooked lever 93 to lock or release another profile tube 8 (not shown). In order to facilitate the access of the screw lever 85, an usher tube 97 has to be provided mounting between a pair of parallel rails 98.

Such kind of clamping means 9 has an adjustable hooked lever 93 which is able to be pulled back into the shell 90. It is able to be applied to profile tubes having various thickness. But such kind clamping means has some shortcomings. First, the hooked lever must be flexible. If it is rigid, it will not be able to be pulled into the shell and cannot lock the profiled tube. But a flexible hooked lever will significantly decrease a strength of the hooked lever. Such clamp cannot be applied to heavy duty assemblies of huge profile tubes. Second, an adjustable distance of the hooked lever is decided by an eccentric rate of an eccentric wheel controlling the hooked lever. The eccentric rate is usually small, which means the adjustable distance of the hooked lever is usually small.

BRIEF SUMMARY OF THE INVENTION

The main object of the invention is to provide a clamp for section tubes which has an adjustable but rigid strong tie bars which is able to be applied to heavy duty assemblies of huge profile.

Another object of the invention is to provide a clamp for section tubes the tie bars of which has a wider range of adjustment.

In order to realize above objects, the invention provides a clamp for section tubes having:

a shell with a pair of opposite side laterals, a front lateral, a rear lateral, a first side wall having a rear opening defined therein, and a second side wall, a fork contained in the shell and having a pair of arms and a fork neck, an end block being fixed to the pair of arms of the fork and having an end slope towards the fork neck, a slide block between the pair of arms and having a rear slope towards the end slope and a thread hole defined therein, a first and a second rigid tie bars each having a rear end pivotally linked to the fork neck of the fork, a hooked head sticking out from the front lateral of the shell and extending opposite with each other, and a middle recess facing towards each other, a pillar having two ends respectively fixed to the pair of opposite side laterals and being sandwiched between the middle recesses, one hole respectively defined in the first side wall and the second side wall of the shell, a control screw having two ends slidably and respectively contained in the holes in the first and the second side walls, at least two end protrusions respectively touching the first and the second side and a middle thread portion rotatably contained in the thread hole in the slide block, an end spring on the rear lateral and pushing the end block, a first side spring on the first side and pushing the first tie bar, and, a second side spring on the second side and pushing the second tie bar.

For the clamp of the invention, the tie bars thereof is adjustable and rigid. They are able to be stronger in structure than conventional flexible tie bars thus being able to be applied to heavy duty assemblies situations.

Secondly, with the structure of end slope and rear slope instead of the eccentric control screw, a range of adjustment of the tie bars is significantly increased. The clamp is able to be applied to section tubes of more variety thickness.

These and other objectives, features, and advantages of the present invention will become apparent from the following detailed description, the accompanying drawings, and the appended claims.

DETAILED DESCRIPTION OF THE INVENTION

Figure 1:
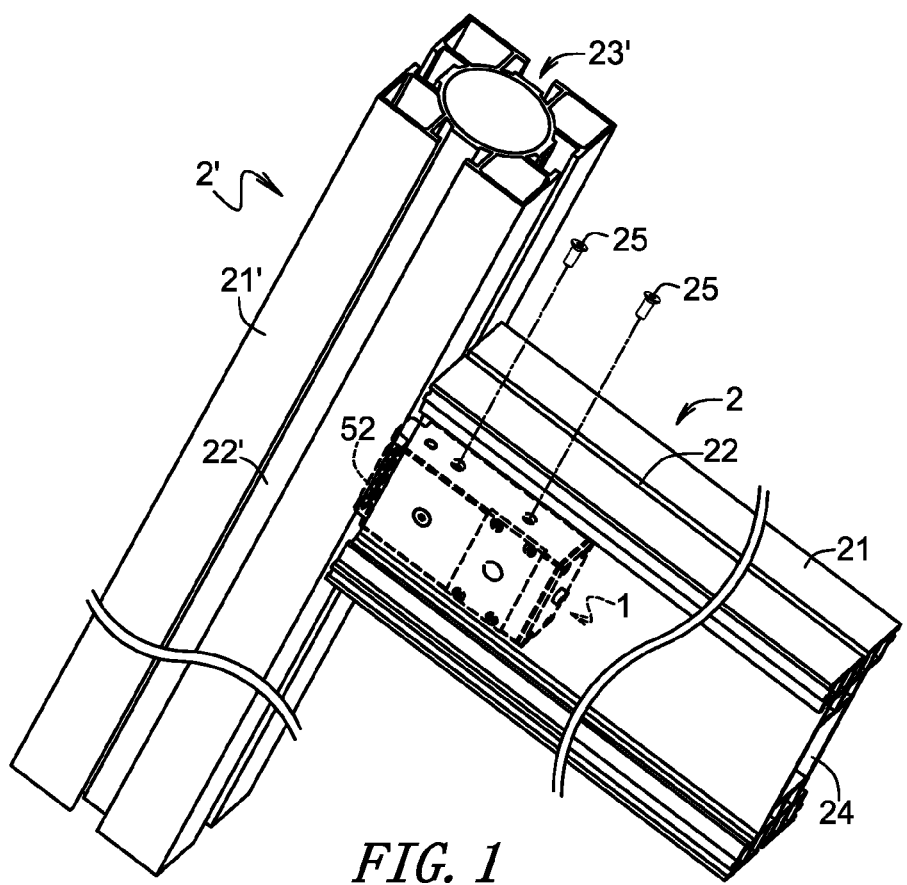
FIG. 1 is a perspective view of the preferred embodiment of a clamp and a section tube.
Figure 2:
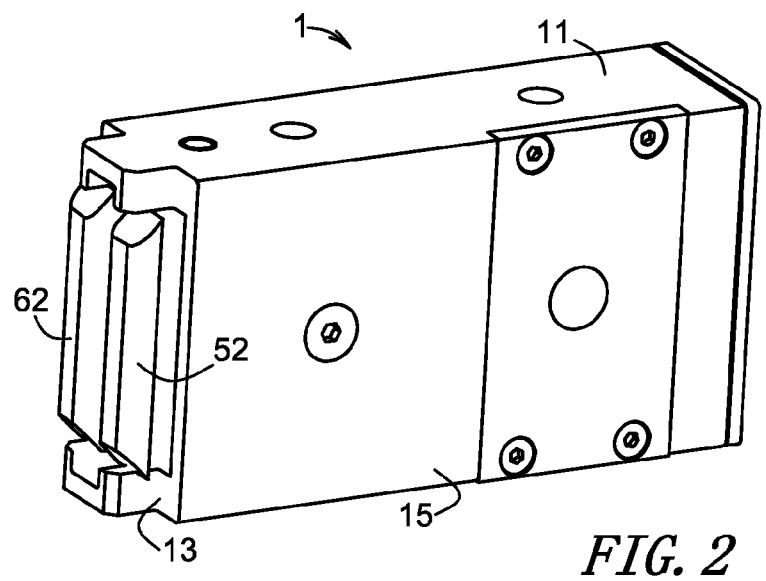
FIG. 2 is a perspective view of the clamp.
Figure 3:
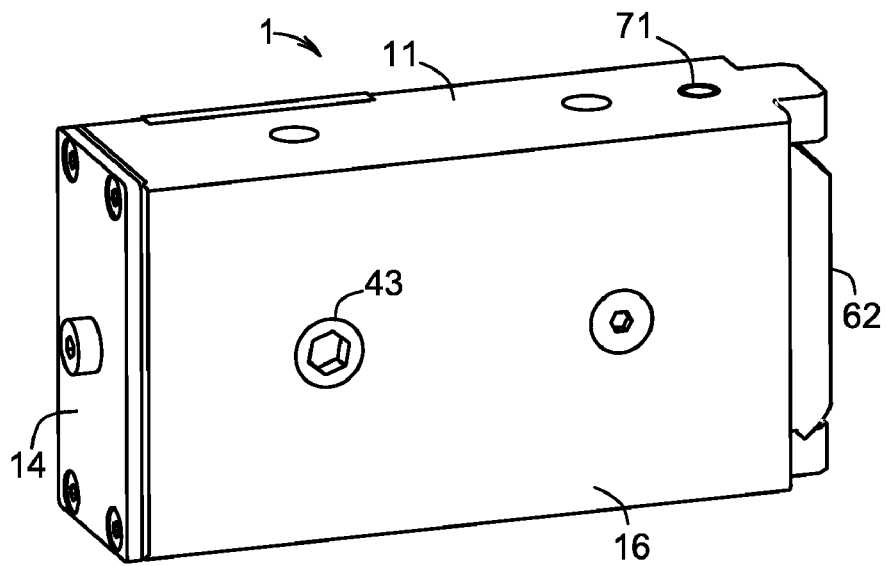
FIG. 3 is another perspective view of the clamp.
Figure 4:
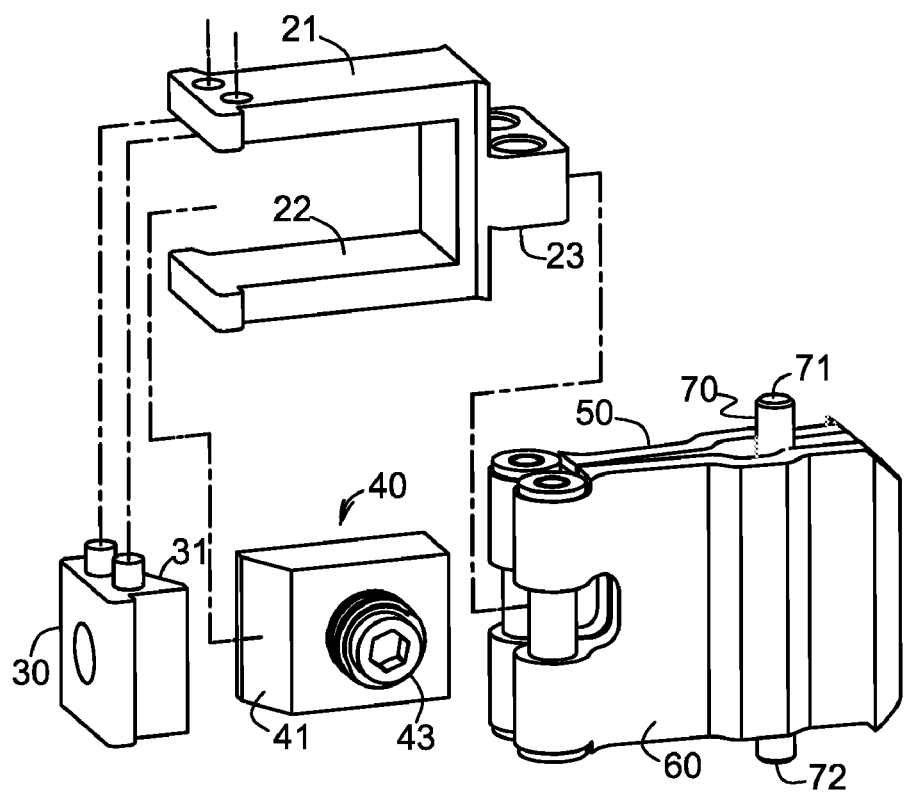
FIG. 4 is an exploded perspective views of the clamp without a shell thereof.
Figure 5:
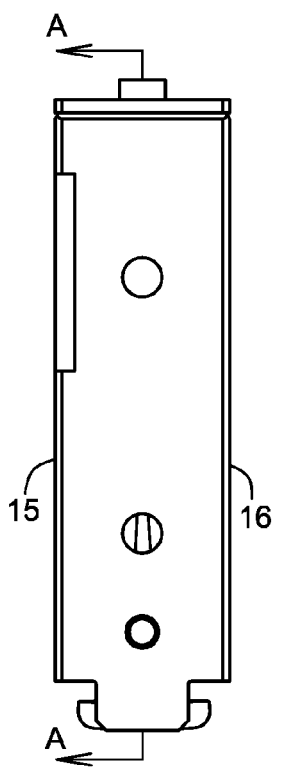
FIG. 5 is a side plane view of the clamp.
Figure 6:
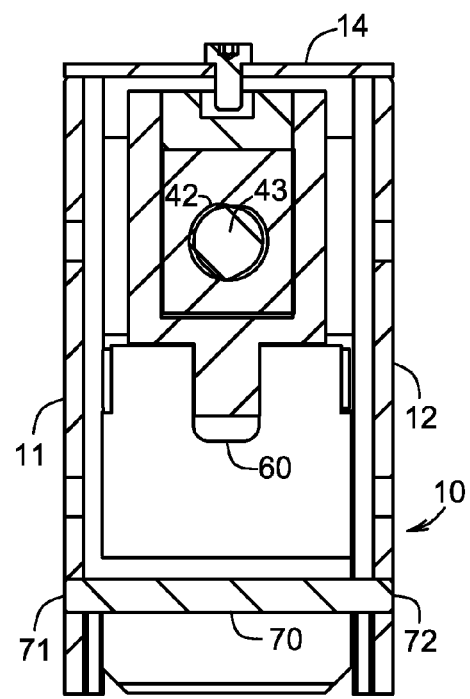
FIG. 6 is a cross-sectional view of the clamp along line A-A of FIG. 5.
Figure 7:
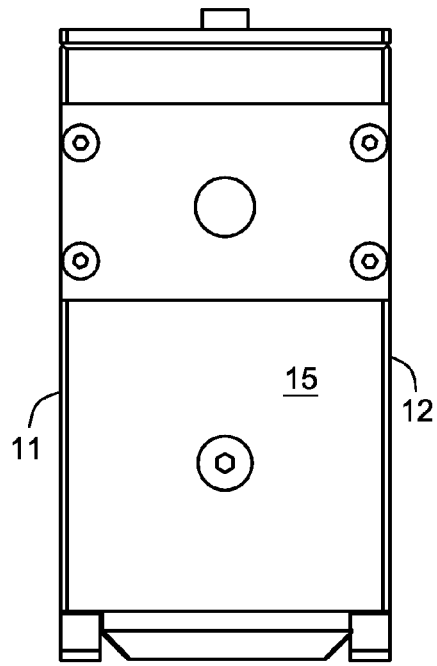
FIG. 7 is another side plane view of the clamp.

Shown in FIGS. 1 and 2 are the preferred embodiment of a clamp 1 and section tubes 2 of the invention. The section tube 2 has at least four identical side surfaces 21, each having a longitudinal slit 22 defined therein. Beneath each slit 22 there is an inward space 23. The clamp 1 is able to be inserted into the inward space 23 of the section tube 2. The clamp 1 is able to be securely fixed with respect to the section tube 2 with a plurality screws 25. When the clamp 1 is fixed, hooked heads 52, 62 of a tie bar (not shown in this Fig.) stick out of an end of one section tube 2 and are able to be inserted into one inward space 23' of another section tube 2' from a free end of the another section tube 2'. When a user rotates a control screw 43 with a screw driver (not shown), the hooked heads 52, 62 move inwards the clamp 1 thus inter-locking the another section tube 2' with the section tube 2. A reverse rotation of the control screw 43 may drive the hooked heads 52, 62 outwards the clamp 1, making the another section tube 2' released.

With reference to FIGS. 3 to 7, the clamp 1 of the invention has a shell 10 with a pair of opposite side laterals 11, 12, a front lateral 13, a rear lateral 14, a first side wall 15, and a second side wall 16. The shell 10 contains a fork 20 having a pair of arms 21, 22 and a fork neck 23, an end block 30 being fixed to the pair of arms 21, 22 of the fork 20 and having an end slope 31 towards the fork neck 23, a slide block 40 between the pair of arms 21, 22 having a rear slope 41 towards the end slope 31, a first and a second rigid tie bars 50, 60 each having a rear end 51, 61 pivotally linked to the fork neck 23 of the fork 20, a hooked head 52; 62 sticking out from the front lateral 13 of the shell 10 and extending opposite with each other, and a middle recess 53, 63 facing towards each other, and a pillar 70 having two ends 71 and 72 respectively fixed to the pair of opposite side laterals 11, 12 and being sandwiched between the middle recesses 53, 63. One hole 17, 18 is respectively defined in the first side wall 15 and the second side wall 16 of the shell 10. A threaded hole 42 is defined in the slide block 40. A control screw 43 is provided having at least two end protrusions 44, 45 respectively touching the first and the second side walls 15, 16 and a middle thread portion 46. An end spring 32 is provided between the rear lateral 14 and the end block 30, and a first and a second side springs 54, 64 are provided respectively between the first side wall 15 and the first tie bar 50 and the second side wall 16 and the second tie bar 60.

Figure 8:
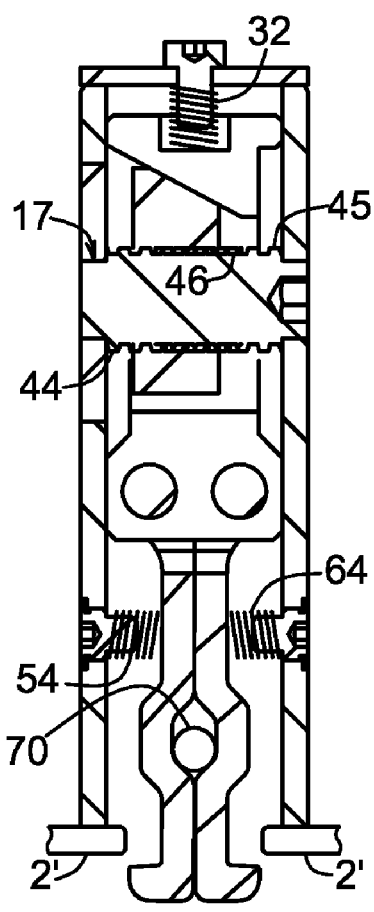
FIGS. 8 and 9 are a cross-sectional views of the clamp along line B-B of FIG. 7 showing an operation thereof.
Figure 9:
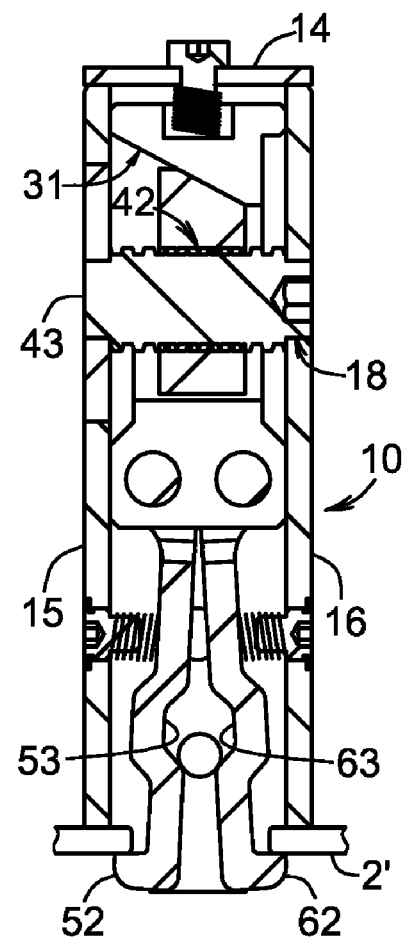
Figure 10:
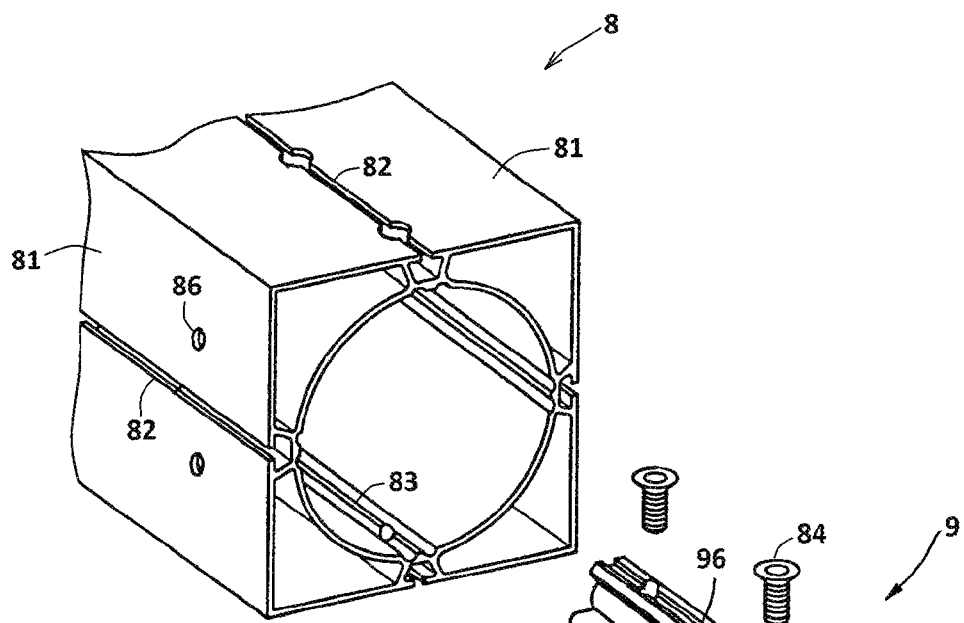
FIG. 10 is a perspective exploded view of a conventional clamping means and the profile tube. And, FIG. 11 is a cross-sectional view of the conventional clamping means and the profile tube shown in FIG. 10.
Figure 11:
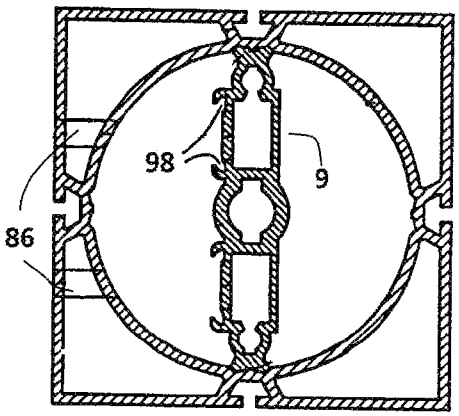

As shown in FIG. 8, the end block 30 is urged by the end spring 32 to touch the rear slope 41 of the slide block 40 with the end slope 31 thereof. In use, a user is able to rotate the control screw 43 with a screw driver (not shown) to tighten the clamp 1. When the control screw 43 rotates, the slide block 40 moves from the first side wall 15 to the second side wall 16 along the control screw 43. The rear slope 41 moves along the end slope 31, pushing the end block 30 to move rearward to the rear lateral 14 against the end spring 32. The end block 30 will drive the fork 20 fixed thereto and the first and the second tie bars 50, 60 linked to the fork 20 rearward accordingly. The first and the second rigid tie bars 50, 60 will meet and be driven to move apart by the pillar 70 formerly received in the middle recesses 53, 63, respectively against the first and the second side springs 54, 64, as shown in FIG. 9. At this time, the hooked heads 52, 62 will be able to securely fix the section tube 2'. A reverse operation of the control screw 43 will be able to loosen the clamp 1 and the first and the second rigid tie bar 50, 60 will move close to each other under a resuming force of the first and the second side springs 54, 64 as shown in FIG. 8. The clamp 1 is able to be moved out from a slit 22' of the another section tube 2'.

From above description, it could be seen that the control screw 19 of the invention is pre-assembled in the clamp 1 and does not need to be pressed down or to align with a through hole on site of production of section tube framework. Second, without the provision of the latch shell, for a predetermined size of a section tube, there could be more room for a wider tie bar and hooked heads. The strength of the tie bar is increased. Third, a control screw 19 with an integral usher tube 191 having a tapering inner surface 192 saves the time for mounting and aligning the conventional separate usher tubes.

From above description, it is seen that the objects of the present invention have been fully and effectively accomplished. Embodiment of the invention has been shown and described for the purposes of illustrating the functional and structural principles of the present invention and is subject to change without departure from the invention's principles. Therefore, this invention includes all modifications encompassed within the spirit and scope of the following claims.

The invention claimed is:

1. A clamp for section tubes comprising:
   a shell with a pair of opposite side laterals, a front lateral, a rear lateral, a first side wall having a rear opening defined therein, and a second side wall,
   a fork contained in the shell and having a pair of arms and a fork neck,
   an end block being fixed to the pair of arms of the fork and having an end slope towards the fork neck,
   a slide block between the pair of arms and having a rear slope towards the end slope and a thread hole defined therein,
   a first and a second rigid tie bars each having a rear end pivotally linked to the fork neck of the fork, a hooked head sticking out from the front lateral of the shell and extending opposite with each other, and a middle recess facing towards each other,
   a pillar having two ends respectively fixed to the pair of opposite side laterals and being sandwiched between the middle recesses,
   one hole respectively defined in the first side wall and the second side wall of the shell,
   a control screw having two ends slidably and respectively contained in the holes in the first and the second side walls, at least two end protrusions respectively touching the first and the second side and a middle thread portion rotatably contained in the thread hole in the slide block,
   an end spring on the rear lateral and pushing the end block,
   a first side spring on the first side and pushing the first tie bar, and,
   a second side spring on the second side and pushing the second tie bar.

* * * * *